US010725645B2

(12) United States Patent
Kashima et al.

(10) Patent No.: US 10,725,645 B2
(45) Date of Patent: Jul. 28, 2020

(54) INFORMATION PROCESSING DEVICE FOR CONTROLLING DISPLAY OF WEB PAGES USING MAIN DISPLAY AREA AND SUB DISPLAY AREA

(71) Applicant: Rakuten, Inc., Tokyo (JP)

(72) Inventors: Rei Kashima, Tokyo (JP); Takehiro Ogita, Tokyo (JP); Junko Takemoto, Tokyo (JP)

(73) Assignee: Rakuten, Inc., Tokyo (JP)

( * ) Notice: Subject to any disclaimer, the term of this patent is extended or adjusted under 35 U.S.C. 154(b) by 318 days.

(21) Appl. No.: 14/425,341

(22) PCT Filed: May 20, 2013

(86) PCT No.: PCT/JP2013/063970
§ 371 (c)(1),
(2) Date: Mar. 3, 2015

(87) PCT Pub. No.: WO2014/188496
PCT Pub. Date: Nov. 27, 2014

(65) Prior Publication Data
US 2015/0234561 A1 Aug. 20, 2015

(51) Int. Cl.
*G06F 3/00* (2006.01)
*G06F 3/0485* (2013.01)
(Continued)

(52) U.S. Cl.
CPC .......... *G06F 3/0485* (2013.01); *G06F 3/0481* (2013.01); *G06F 3/04842* (2013.01);
(Continued)

(58) Field of Classification Search
CPC .. G06F 3/0481; G06F 3/0485; G06F 3/04855; G06F 3/04842
See application file for complete search history.

(56) References Cited

U.S. PATENT DOCUMENTS 5,841,435 A * 11/1998 Dauerer ................ G06F 3/0481
715/775
5,930,809 A * 7/1999 Middlebrook ......... G09B 5/065
345/685
(Continued)

FOREIGN PATENT DOCUMENTS

| JP | 2006-259161 A | 9/2006 |
| JP | 2008-210061 A | 9/2008 |
| JP | 2012-38336 A | 2/2012 |

OTHER PUBLICATIONS

Communication from the Japanese Patent Office dated Jun. 10, 2014 from counterpart Japanese Patent Application No. 2014-510596.
(Continued)

*Primary Examiner* — Kieu D Vu
*Assistant Examiner* — Andrew Chung
(74) *Attorney, Agent, or Firm* — Sughrue Mion, PLLC

(57) ABSTRACT

An information processing apparatus is provided that is configured to facilitate the avoidance of a state in which the browsing of a web page displayed in a main display area is hindered by the displaying of a sub display area.

When a web page scrollable in a predetermined scroll direction is displayed in a main display area, the information processing apparatus acquires an arrangement position of a display element displayed in the web page, the arrangement position being a position in a crossing direction crossing the scroll direction, and determines an arrangement position in the crossing direction of the sub display area arranged at a position overlapping the main display area in accordance with the acquired arrangement position of the display element.

15 Claims, 5 Drawing Sheets

(51) Int. Cl.
*G06F 16/957* (2019.01)
*G06F 3/14* (2006.01)
*G09G 5/14* (2006.01)
*G06F 3/0481* (2013.01)
*G06F 3/0484* (2013.01)

(52) U.S. Cl.
CPC ............ *G06F 3/04855* (2013.01); *G06F 3/14* (2013.01); *G06F 16/957* (2019.01); *G09G 5/14* (2013.01); *G06F 2203/04803* (2013.01); *G09G 2340/0464* (2013.01); *G09G 2340/14* (2013.01); *G09G 2370/22* (2013.01)

(56) References Cited

U.S. PATENT DOCUMENTS

| | | | | |
|---|---|---|---|---|
| 7,158,676 | B1* | 1/2007 | Rainsford | H04N 7/17318 348/700 |
| 8,086,601 | B2* | 12/2011 | Kim | G06F 16/951 707/723 |
| 8,122,468 | B2* | 2/2012 | Begeja | G06Q 30/0251 386/287 |
| 8,473,841 | B2* | 6/2013 | Harris | G06F 16/958 715/235 |
| 9,015,620 | B1* | 4/2015 | Delker | G06F 3/0481 715/810 |
| 9,524,073 | B1* | 12/2016 | Fair | G06F 3/0481 |
| 2001/0056370 | A1* | 12/2001 | Tafla | G06F 3/0481 705/14.69 |
| 2004/0003028 | A1* | 1/2004 | Emmett | G06F 16/9577 709/203 |
| 2004/0017941 | A1* | 1/2004 | Simske | G06K 9/00456 382/180 |
| 2005/0010869 | A1* | 1/2005 | Truelove | G06F 17/214 715/275 |
| 2006/0155684 | A1* | 7/2006 | Liu | G06F 16/954 |
| 2006/0236233 | A1* | 10/2006 | Ozawa | H04N 5/44543 715/234 |
| 2006/0236251 | A1* | 10/2006 | Kataoka | G06F 3/0481 715/757 |
| 2007/0216700 | A1* | 9/2007 | Chen | G09G 5/14 345/581 |
| 2007/0242160 | A1* | 10/2007 | Garg | H04N 5/04 348/565 |
| 2007/0266319 | A1* | 11/2007 | Matsuo | G06F 9/45512 715/700 |
| 2008/0055466 | A1* | 3/2008 | Garg | H04N 5/21 348/452 |
| 2008/0155437 | A1* | 6/2008 | Morris | G06F 9/451 715/765 |
| 2008/0294974 | A1* | 11/2008 | Nurmi | G06F 17/30905 715/204 |
| 2009/0049385 | A1* | 2/2009 | Blinnikka | G06F 3/0481 715/719 |
| 2009/0094520 | A1* | 4/2009 | Kulas | G11B 27/105 715/723 |
| 2009/0113444 | A1* | 4/2009 | Hackborn | G06F 9/461 719/312 |
| 2009/0158166 | A1* | 6/2009 | Dewar | G06Q 30/02 715/745 |
| 2009/0193334 | A1* | 7/2009 | Assadollahi | G06F 17/276 715/261 |
| 2009/0313245 | A1* | 12/2009 | Weyl | G06F 17/30253 |
| 2010/0082709 | A1* | 4/2010 | Yamamoto | G06F 16/93 707/812 |
| 2010/0083163 | A1* | 4/2010 | Maghoul | G06F 1/1626 715/781 |
| 2010/0088623 | A1* | 4/2010 | Ichino | G06F 3/0481 715/766 |
| 2010/0107062 | A1* | 4/2010 | Bacus | G06F 17/212 715/269 |
| 2010/0198697 | A1* | 8/2010 | Brown | G06Q 30/02 705/14.73 |
| 2010/0299635 | A1* | 11/2010 | Oh | G06F 3/0482 715/811 |
| 2010/0318655 | A1* | 12/2010 | Kajiya | G06F 8/34 709/225 |
| 2011/0131479 | A1* | 6/2011 | Padgett | G06F 3/04895 715/223 |
| 2011/0258043 | A1* | 10/2011 | Ailaney | G06Q 10/10 705/14.49 |
| 2012/0124519 | A1* | 5/2012 | Uphoff | G06F 17/30964 715/811 |
| 2012/0154264 | A1* | 6/2012 | Wang | A61M 1/16 345/156 |
| 2012/0310751 | A1* | 12/2012 | Kim | G06Q 30/02 705/14.72 |
| 2013/0038540 | A1* | 2/2013 | Anderson | G06F 3/0488 345/173 |
| 2013/0073970 | A1* | 3/2013 | Piantino | G06Q 50/01 715/738 |
| 2013/0111397 | A1* | 5/2013 | Miyoshi | G06F 3/0485 715/784 |
| 2013/0124981 | A1* | 5/2013 | Chao | G06T 11/60 715/243 |
| 2013/0246904 | A1* | 9/2013 | Seliger | G06F 3/0481 715/234 |
| 2013/0275884 | A1* | 10/2013 | Katragadda | H04L 65/403 715/753 |
| 2014/0137004 | A1* | 5/2014 | Berger | G06F 3/0482 715/760 |
| 2014/0165011 | A1* | 6/2014 | Goda | G06F 3/04842 715/853 |
| 2014/0169697 | A1* | 6/2014 | Breckenridge | G06T 11/60 382/284 |
| 2014/0172839 | A1* | 6/2014 | Christoph | G06F 16/9566 707/723 |
| 2014/0181087 | A1* | 6/2014 | Wu | G06F 3/04842 707/722 |
| 2014/0215310 | A1* | 7/2014 | Kim | G06F 3/04883 715/234 |
| 2014/0280080 | A1* | 9/2014 | Solheim | G06F 17/3053 707/723 |
| 2014/0358913 | A1* | 12/2014 | Cai | G06F 16/90348 707/728 |
| 2015/0039996 | A1* | 2/2015 | Kwon | G06F 17/2247 715/234 |
| 2015/0149889 | A1* | 5/2015 | Yang | G06F 3/0485 715/234 |
| 2015/0286345 | A1* | 10/2015 | Garcia-Sanchez | G06F 3/0482 715/829 |
| 2016/0148503 | A1* | 5/2016 | Kachi | G01C 21/3694 701/117 |

OTHER PUBLICATIONS

Communication from the International Searching Authority dated Jul. 16, 2013 in counterpart International Application No. PCT/JP2013/063970.

* cited by examiner

INFORMATION PROCESSING DEVICE FOR CONTROLLING DISPLAY OF WEB PAGES USING MAIN DISPLAY AREA AND SUB DISPLAY AREA

CROSS REFERENCE TO RELATED APPLICATIONS

This application is a National Stage of International Application No. PCT/JP2013/063970 filed May 20, 2013, the contents of which are incorporated herein by reference in their entirety.

TECHNICAL FIELD

The present invention relates to an information processing apparatus, an information processing method, a control program thereof, and a server apparatus that are intended to control the displaying of web pages.

BACKGROUND ART

Information processing apparatuses are known in which a web page is displayed in a window (a main display area) that occupies part or all of a display screen by executing a web browser program. If a web page is too large in size to be fit into a main display area, a user is able to display any position of the web page into the main display area by executing scrolling operation. However, this control may sometimes cause important information in a web page to be scrolled out of the main display area, disappearing from the view of the user. In order to circumvent this problem, technologies for keeping important buttons and the like displayed in the main display area have been under examination (refer to Patent Literature 1 for example).

CITATION LIST

Patent Literature

[Patent Literature 1]
Japanese Patent Laid-Open No. 2008-210061

SUMMARY

Technical Problem

One of technologies for displaying important information on a screen is an approach for displaying a sub display area (a floating window or the like) that includes other pieces of information in superimposition with the main display area. If the important information in a web page is scrolled out, this approach allows the important information to be displayed on a screen by a method of displaying a sub display area that includes this scrolled out important information, for example. However, because the sub display area is displayed at a position superimposing the main display area, part of the web page displayed in the main display area is hidden from the view. Hence, in some cases, such troubles may occur as that other pieces of important information displayed in the main display area are hidden from the view.

The present invention was made by taking the above-mentioned situations into consideration and one object of the present invention is to provide an information processing apparatus, an information processing method and a control program thereof, and a server apparatus that are configured to easily circumvent conditions in which the viewing of web page displayed on a main display area is hindered by the displaying of a sub display area.

Solution to Problem

An information processing apparatus related to the present embodiment is an information processing apparatus for determining an arrangement position of a sub display area in a screen of a display apparatus displaying a main display area and the sub display area such that the main display area and the sub display area are overlapped with each other. This information processing apparatus has: element position acquisition means for acquiring an arrangement position of a display element arranged in a web page, the arrangement position being a position in a crossing direction crossing a predetermined scroll direction of the web page displayed to be scrollable in the main display area; and arrangement position determination means for determining an arrangement position in the crossing direction of the sub display area in accordance with the acquired arrangement position of the display element.

An information processing method related to the present invention is an information processing method for determining an arrangement position of a sub display area in a screen of a display apparatus displaying a main display area and the sub display area such that the main display area and the sub display area are overlapped with each other. This information processing method has the steps of: acquiring an arrangement position of a display element arranged in a web page, the arrangement position being a position in a crossing direction crossing a predetermined scroll direction of the web page displayed to be scrollable in the main display area; and determining an arrangement position in the crossing direction of the sub display area in accordance with the acquired arrangement position of the display element.

A program related to the present invention is a program for determining an arrangement position of a sub display area in a screen of a display apparatus displaying a main display area and the sub display area such that the main display area and the sub display area are overlapped with each other. This program causes a computer to function as: element position acquisition means for acquiring an arrangement position of a display element arranged in a web page, the arrangement position being a position in a crossing direction crossing a predetermined scroll direction of the web page displayed to be scrollable in the main display area; and arrangement position determination means for determining an arrangement position in the crossing direction of the sub display area in accordance with the acquired arrangement position of the display element. This program may be provided by storing the program in a computer-readable information storage medium.

A server apparatus related to the present invention is a server apparatus that is connectable with a client apparatus. This server apparatus has: distribution data storage means for storing distribution data including data of a web page including a plurality of display elements and a control program for use in display control of a sub display area; and data transmission means for transmitting the distribution data to the client apparatus in response to a request from the client apparatus. The control program is a program for determining an arrangement position of a sub display area when the client apparatus displays the web page in a main display area in a mode scrollable in a predetermined scroll direction and displays the sub display area at a position overlapping with the main display area. The program causes the client apparatus to execute the steps of: acquiring an arrangement position of a display element arranged in the web page, the arrangement position being a position in a crossing direction crossing the scroll direction; and determining an arrangement position in the crossing direction of the sub display area in accordance with the acquired arrangement position of the display element.

DESCRIPTION OF EMBODIMENT

The following describes in detail embodiment of the present invention with reference to accompanying drawings.

Figure 1:
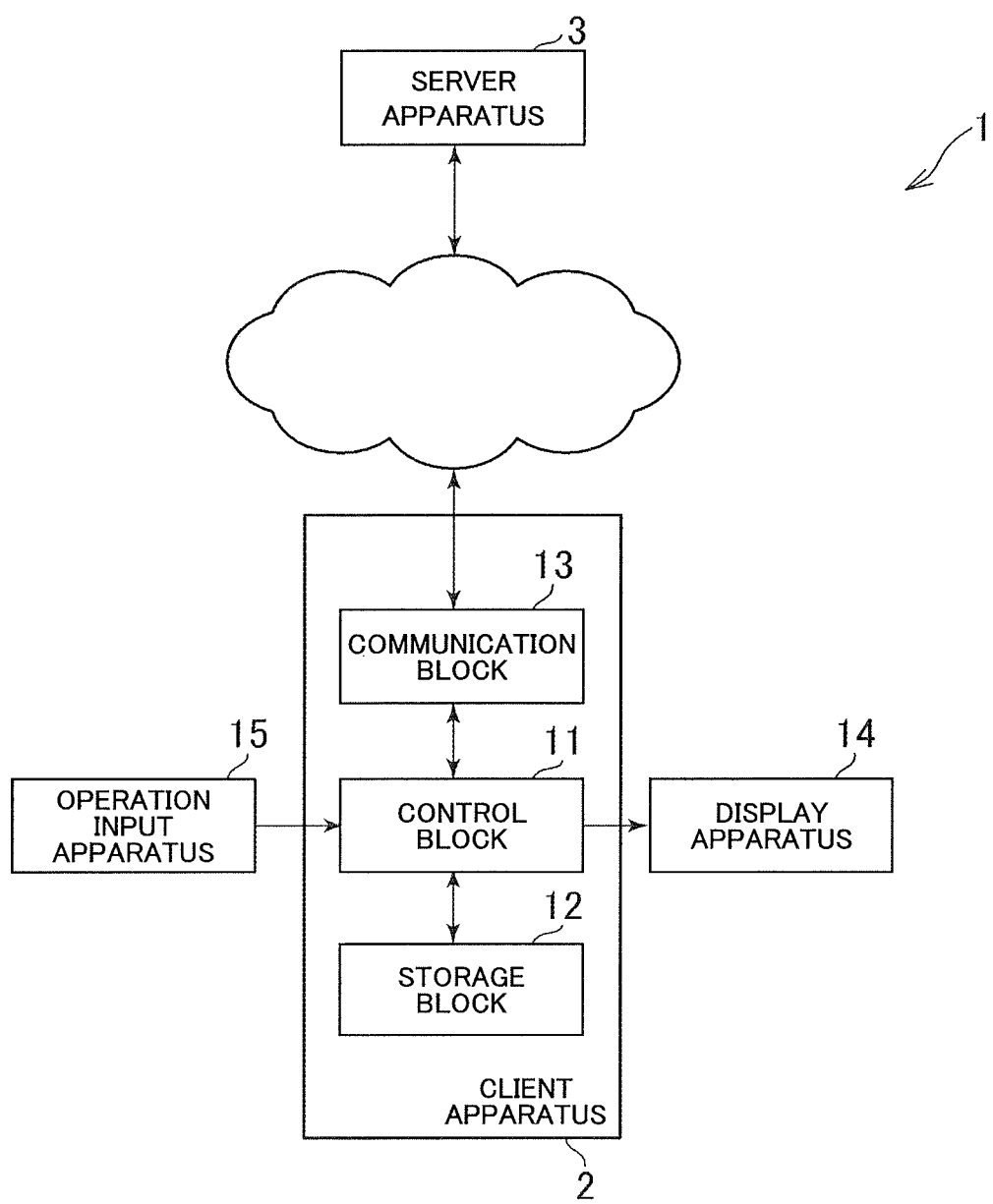
FIG. 1 is a total configuration diagram illustrating a service providing system that includes an information processing apparatus practiced as one embodiment of the present invention.

Now, referring to FIG. 1, there is shown a total configuration diagram of a service providing system 1. As shown in the figure, the service providing system 1 is configured by a client apparatus 2 that is an information processing apparatus practiced as one embodiment of the present invention, and a server apparatus 3 that is prepared by a service provider. The client apparatus 2 is a personal computer, a smart phone, or a tablet, for example, and as shown in FIG. 1, is configured by a control block 11, a storage block 12, and a communication block 13. The client apparatus 2 is also connected to a display apparatus 14 and an operation input apparatus 15.

The control block 11 is a CPU for example and, as instructed by a program stored in the storage block 12, executes various types of information processing. The storage block 12 is configured by a memory element such as a RAM for example and stores programs to be executed by the control block 11 and data to be processed by these programs. Especially, in the present embodiment, the storage block 12 stores a web browser program and temporarily stores data such as HTML data for example downloaded from the server apparatus 3.

The communication block 13 is a communication interface such as a LAN card for example and the client apparatus 2 downloads various kinds of data from the server apparatus 3 through the communication block 13. The client apparatus 2 and the server apparatus 3 are communicably interconnected via various communication networks such as the Internet for example.

The display apparatus 14 is a liquid crystal display panel or an organic EL display panel for example and has a screen S for displaying various kinds of information in accordance with a video signal transmitted from the client apparatus 2. The operation input apparatus 15 is a keyboard, a mouse, a touch panel, and so on, and accepts various kinds of operations entered by a user of the client apparatus 2 to output the information indicative of contents of each operation to the client apparatus 2. It should be noted that the display apparatus 14 and the operation input apparatus 15 may be standalone units separated from the client apparatus 2 or may be configured to be unitized with the client apparatus 2.

By executing a web browser program stored in the storage block 12, the control block 11 of the client apparatus 2 generates a web page P on the basis of the HTML data downloaded from the server apparatus 3 and displays the contents of this page. Especially, in the present embodiment, the client apparatus 2 displays the contents of the web page P in a main display area occupying part or all of screen S of the display apparatus 14 and, at the same time, displays a sub display area smaller than the main display area such that the sub display area overlaps with the main display area on screen S. In what follows, the main display area and the sub display area are referred to as a main window MW and a sub window SW, respectively, for the convenience of description. The main window MW is a display area in which the body of the web page P is to be displayed. The sub window SW is a floating window for example that is smaller than the main window MW and arranged in front of the main window MW.

Figure 2:
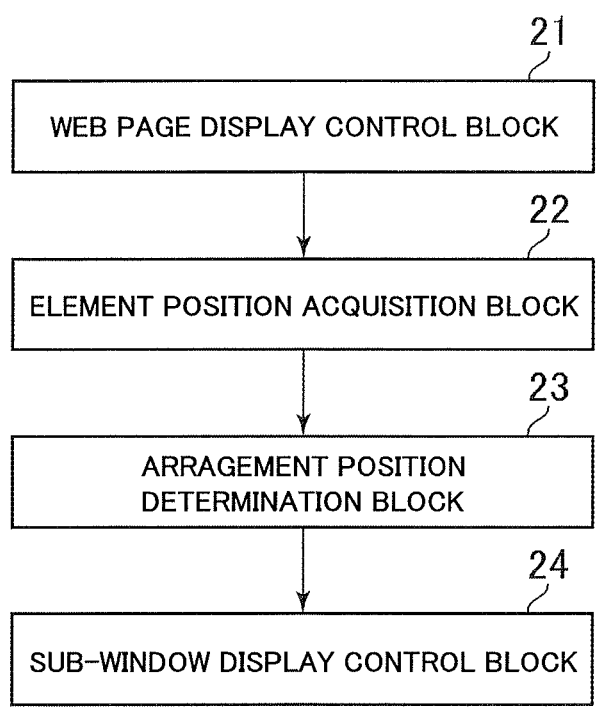
FIG. 2 is a functional block diagram illustrating the information processing apparatus practiced as one embodiment of the present invention.

As shown in FIG. 2, the client apparatus 2 is functionally configured by a web page display control block 21, an element position acquisition block 22, an arrangement position determination block 23, and a sub-window display control block 24. These functions are realized by executing, by the control block 11, the programs stored in the storage block 12. Especially, the web page display control block 21 is realized by a web browser program. The element position acquisition block 22, the arrangement position determination block 23, and the sub-window display control block 24 are realized by interpreting and executing a control program downloaded from the server apparatus 3 by the web browser program. This control program may be described by a script such as JavaScript (trademark) for example. This script may be provided to the client apparatus 2 while being embedded in the HTML data or may be provided to the client apparatus 2 while being stored in a script file separate from the HTML data.

The web page display control block 21 interprets the HTML data downloaded from the server apparatus 3 to generate a web page P and displays the generated web page P on the main window MW. The processing of web page generation is realized by a known rendering engine included in the web browser program. The web page P is configured by two or more display elements E specified by the HTML data and the web page display control block 21 arranges these display elements E inside the web page P to generate the web page P. The display elements E in the present embodiment are indicative of the substance of content included in the web page P and are the elements actually displayed on the screen S. To be more specific, these elements include blocks of texts surrounded by paragraph tags in the HTML data, titles, images, and tables, for example. The display element E may be an element indicative of content surrounded by HTML tags that specify not inline elements but block-level elements.

In the present embodiment, it is assumed that the web page P displayed in the main window MW be in excess of the length of the main window MW in the length along a predetermined scroll direction (hereafter referred to as Y-direction) and scrollable along this scroll direction. Also, here, the Y-direction is assumed to match the vertical direction of the main window MW. Generally, the width of the horizontal direction of the web page P is fixed in conformity with the width of the horizontal direction of the main window MW. If the substance of the content included in the web page P is too large to be fit all into the main window MW, then the size of the web page P is enlarged in the vertical direction (Y-direction).

In accordance with an operation input by a user into the operation input apparatus 15, the web page display control block 21 executes control for scrolling the web page P displayed in the main window MW along the Y-direction. Consequently, the user is able to display any part of the web page P with the length of the Y-direction longer than the length of the vertical direction of the main winder MW into the main window MW. It should be noted that the web page display control block 21 may automatically scroll the web page P along the Y-direction with time without being directly instructed by the user.

Figure 3:
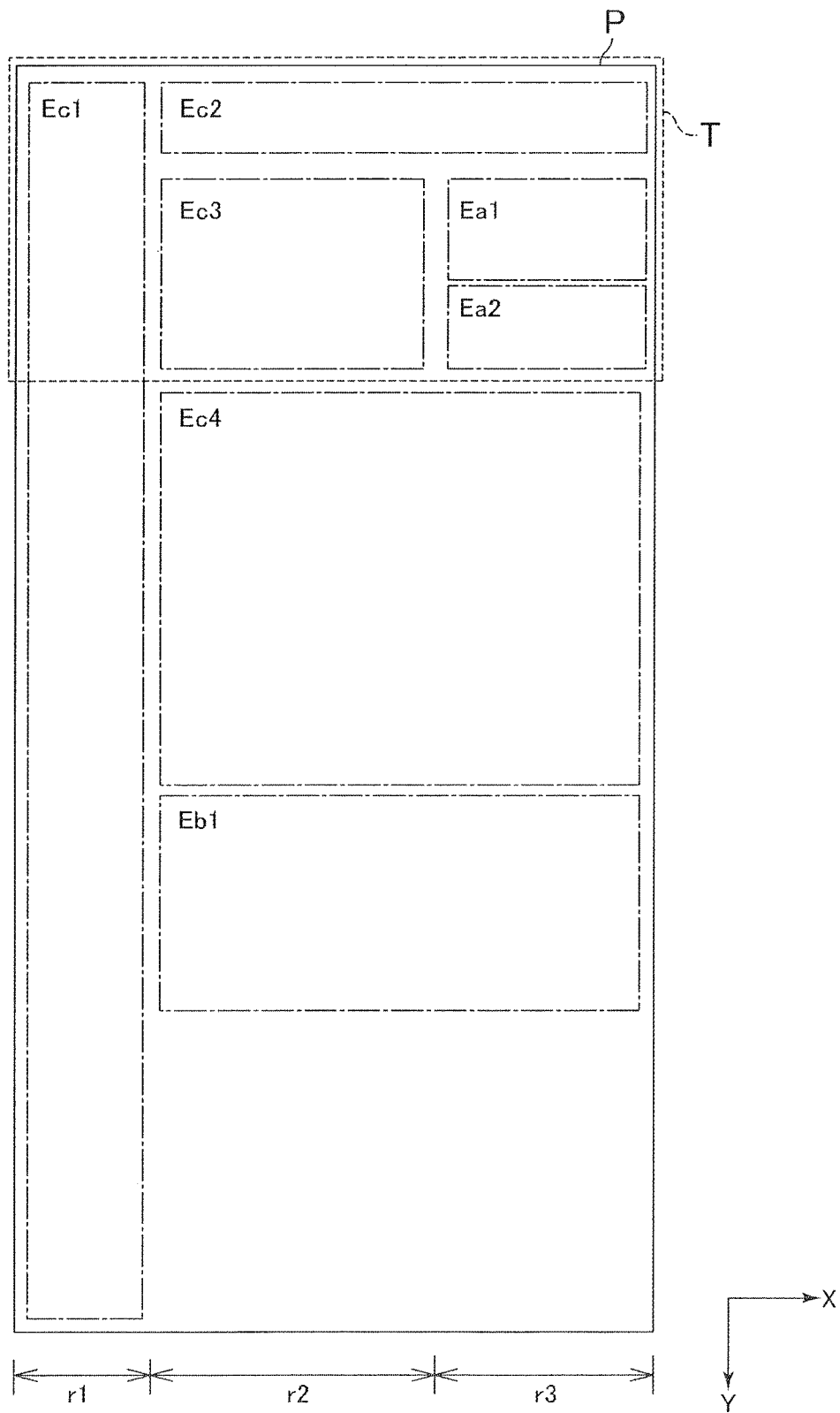
FIG. 3 is a diagram illustrating one example of a web page.

Referring to FIG. 3, there is shown a diagram illustrating one example of the web page P that is generated by the web page display control block 21. Rectangles enclosed by dash-dot lines are indicative of display elements E; in this example, the web page P includes seven display elements E, namely, display elements Ea1, Ea2, Eb1, Ec1, Ec2, Ec3, and Ec4. In addition, in the figure, a rectangle enclosed by dash lines is indicative of a display target range T that is displayed in the main window MW, out of the web page P; in an initial state, the top part of the web page P included in the display target range T in the figure is displayed in the main window MW. Moving up and down of this display target range T in accordance with an instruction by the user causes the web page P to be scrolled along the vertical direction of the main window MW.

The element position acquisition block 22 acquires information related to an arrangement position of the display element E that is arranged in the web page P generated by the web page display control block 21. Especially, the element position acquisition block 22 acquires, for each of display elements E making up the web page P, information indicative of an arrangement position in a crossing direction (hereafter referred to as X-direction) crossing the scroll direction (Y-direction) of the web page P. As described above, here, Y-direction matches the vertical direction of the main window MW, so that the X-direction matches the horizontal direction of the main window MW. The web page display control block 21 generates the web page P by arranging two or more display elements E in accordance with various types of conditions such as the size of main window MW. Hence, until the web page display control block 21 actually generates the web page P, which position in the web page P each of the display elements E making up the web page P is arranged to is not determined; depending upon the type of the client apparatus 2 or the size of the main window MW, even the same display element E may be arranged at different positions in the main window MW. Therefore, the element position acquisition block 22 acquires the information for identifying a position in the web page P of each of the display elements E after the web page P has actually been generated by the web page display control block 21.

By using the information related to the arrangement positions of the display elements E acquired by element position acquisition block 22, the arrangement position determination block 23 determines the arrangement position of the sub window SW. To be more specific, the arrangement position determination block 23 determines the arrangement position in the X-direction of the sub window SW in view of the positions of the display elements E arranged in the web page P, such that the X-direction position of the sub window SW is determined to avoid the X-direction position occupied by a display element E satisfying a predetermined condition, or the X-direction position of the sub window SW is determined to overlap the X-direction position occupied by a display element E satisfying another predetermined condition. It should be noted that the arrangement position determination block 23 may determine not only the position of the sub window SW but also the size along the X-direction by use of the information related to the arrangement positions of the display elements E. A specific example of a method how the arrangement position determination block 23 determines the arrangement position of the sub window SW will be detailed later.

The sub-window display control block 24 displays the sub window SW at an arrangement position determined by the arrangement position determination block 23. Consequently, the user is able to browse both the contents of the web page P included in the main window MW and the information included in the sub window SW at the same time. It should be noted that the information that is displayed in the sub window SW is generated by interpreting the HTML data downloaded from the server apparatus 3 like the contents of the web page P. The sub window SW may include various kinds of information such as information like advertisements that service providers want to send to users and information related to users who are logged in on services currently provided by the server apparatus 3, for example. Also, various kinds of objects that are operated by the user such as a purchase button in an EC site may be included.

The sub-window display control block 24 may display the sub window SW only when a predetermined condition is satisfied without always displaying the sub window SW while the web page P is displayed in the main window MW. To be more specific, the sub window SW may be displayed when the user executes a specific operation or the sub window SW may be displayed or terminate the display with start or end of scrolling of the web page P used as a trigger. In addition, the sub window SW may be displayed or terminate the display with an event such that a specific display element E scrolls into the main window MW or scrolls out of the main window MW by scrolling the web page P used as a trigger.

The following describes a specific example of a method how the arrangement position determination block 23 determines an arrangement position of the sub window SW.

In the following example, an index related to visibility by the user of the display element E concerned is set to each display element E in the web page P and, by referencing this index, the arrangement position determination block 23 determines an arrangement position of the X-direction of the sub window SW. Here, the index related to the visibility denotes a scale indicative whether it is easy for the user to grasp the contents indicated by the target display element E. For example, it is considered that such display element E of which the contents the user is able to grasp at a glance as an image is high in visibility. In the case of the display element E made up of characters, as the number of the characters decreases or the font size of the characters get large, visibility increases, in general. Hence, the display element E made up of the characters indicative of a title of the content for example increases in visibility. In what follows, the index related to the visibility set to each display element E is noted as a visibility rank.

The display element E that is high in visibility can be easily browsed by the user while the web page P is being scrolled for example. Conversely, it tends to be difficult for the user to read the contents of the display element E low in visibility while the web page P is being scrolled. Therefore, the arrangement position determination block 23 avoids arranging the sub window SW at a position that possibly overlaps with the display elements E comparatively high in visibility but arranges the sub window SW at a position that overlaps only with the display elements E comparatively low in visibility, for example. This arrangement allows the user to quickly grasp the overview of the web page P by browsing the information in the sub window SW and the display elements E high in visibility in the web page P while scrolling the web page P and slowly browse the display elements E low in visibility after scrolling the web page P to a position where it does not overlap with the sub window SW.

Especially, the arrangement position determination block 23 determines an arrangement position of the sub window SW in the X-direction (namely, the direction crossing the scroll direction of the web page P) by considering the arrangement position along the X-direction of each display element E included in the entire web page P. To be more specific, in determining an arrangement position of the sub window SW to be displayed overlapping with the main window MW, the arrangement position determination block 23 takes into consideration not only the display element E to be displayed in main window MW at that point of time but also arrangement positions of other display elements E that are possibly displayed in the main window MW by scrolling, these other display elements E being not displayed in the main window MW at that point of time. Consequently, even if the user scrolls the web page P, the arrangement position of the sub window SW can be determined such that specific display element E does not overlap with the sub window SW.

The following describes a specific example of the method of determining an arrangement position of the sub window SW by use of the web page P shown in FIG. 3. Here, it is assumed that the visibility ranks of the display elements E be set in three steps of A, B, and C in the descending order of the visibility and the display elements Ea1 and Ea2 be set to visibility rank A, the display element Eb1 to visibility rank B, and the display elements Ec1 through Ec4 to visibility rank C. With the position of the end in the X-direction of each display element E being a boundary, the arrangement position determination block 23 divides the positional coordinates along the X-direction of the web page P into two or more ranges. Then, for each of the two or more ranges obtained by the division, a visibility rank of the display element E highest in visibility rank among the display elements E included in the range concerned is identified. In the example shown in FIG. 3, the positional coordinates in the X-direction are divided into three ranges of r1, r2, and r3. Then, because only display element Ec1 of visibility rank C exists in the range r1, the visibility rank of this range r1 is C. On the other hand, the display element Eb1 of visibility rank B and the display elements Ec2 through Ec4 of visibility rank C exist together in the range r2, so that the visibility rank of range r2 is B that is the highest visibility rank. The display elements Ea1 and Ea2 of visibility rank A exist in the range r3, so that the visibility rank of this range r3 is A.

Figure 4:
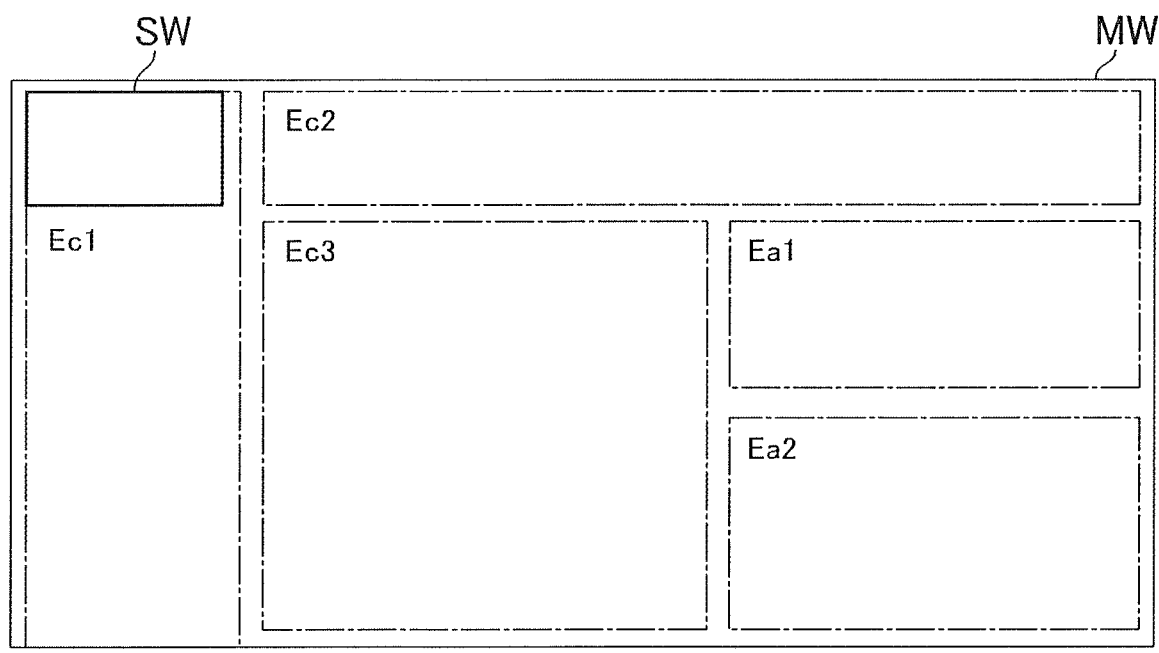
FIG. 4 is a diagram illustrating one display example of a main window and a sub window.

By use of the visibility ranks of the ranges determined as described above, the arrangement position determination block 23 determines the arrangement position in the X-direction of the sub window SW. To be more specific, by avoiding a position that possibly overlaps with the display element E of visibility rank A or the display element E of visibility rank B, the arrangement position determination block 23 determines an arrangement position of the sub window SW so as to be displayed in the range r1 of visibility rank C. At this moment, the arrangement position determination block 23 may determine the horizontal width of the sub window SW (namely, the size along the X-direction of the sub window SW) such that the horizontal width fits in the range r1. FIG. 4 shows a display example of the main window MW with the sub window SW arranged at a position and in a size determined as described in the example mentioned above.

In this example, only display elements Ec2 and Ec3 of visibility rank C are arranged in range r2 in an initial state (a state in which the display target range T is set to a position shown in FIG. 3) with the web page P displayed in the main window MW. However, in the lower section of the web page P, the display element Eb1 of visibility rank B exists in the range r2. Hence, by determining an arrangement position of the sub window SW such that the arrangement position does not overlap with this range r2, the sub window SW will not overlap with the display element Eb1 of visibility rank B after scrolling. It should be note that, in the above description, the sub window SW is arranged in the range r1 of visibility rank C; it is also practicable to arrange the sub window SW inside a range equal to or lower than visibility rank B (the ranges r1 and r2 in the example shown in FIG. 3).

The visibility rank of each display element E may be individually set by a creator of the HTML data for each display element E, for example. In this case, the creator of the HTML data is able to set the visibility rank of each display element E by a method of assigning predetermined attribute information to HTML tags for specifying each display element E, for example. Alternatively, the visibility rank of each display element E may be automatically set in accordance with the type or attribute of the display element E. To be more specific, the visibility rank may be set in advance for each type of the HTML tag specifying the display element E as with setting the visibility rank of the display element E specified by a title tag to A, for example. In addition, the visibility rank may be determined in accordance with various kinds of attribute information specified for the display element E, such as a font size specified by CSS (Cascade Style Sheets) for the characters included in each display element E.

Also, in accordance with whether or not the web page P is being scrolled in the Y-direction, the arrangement position determination block 23 may change the arrangement position in the X-direction of the sub window SW and the size in the X-direction. For example, the sub window SW may be arranged at a position not overlapping with the display element E high in visibility during scrolling as described above and the sub window SW may be arranged at a predetermined position regardless of a visibility rank while scrolling is not being executed. This setup allows displaying of the sub window SW in a mode where the display element E having a high visibility can be browsed especially while scrolling is being executed.

Further, the arrangement position determination block 23 may determine an arrangement position and a size of the X-direction of the sub window SW while the web page P is being scrolled in the Y-direction in accordance with a speed of this scrolling. To be more specific, while the web page P is displayed, the arrangement position determination block 23 always monitors a scroll speed of the web page P and, if the scroll speed is equal to or higher than the predetermined first threshold Th1, determines a position and a size of the sub window SW such that the horizontal width of the sub window SW extends the entire main window MW. If the scroll speed is less than the first threshold Th1 and equal to or higher than the predetermined second threshold Th2, then the arrangement position determination block 23 determines a position and a size of the sub window SW such that the sub window SW is displayed in the ranges (the ranges r1 and r2 in the example shown in FIG. 3) having the visibility rank equal to or lower than B. Further, if the scroll speed is less than the second threshold Th2, then the arrangement position determination block 23 determines a position and a size of the sub window SW such that the sub window SW is displayed in a range (the range r1 in the example shown in FIG. 3) having a visibility range equal to or lower than C.

Generally, as a scroll speed increases, the visibility for the web page P being displayed in the main window MW lowers. Hence, when scroll speed is high, the number or size of ranges in which the sub window SW can be arranged can be increased by determining an arrangement position of the sub window SW like the case in which the visibility rank of each display element E included in the web page P is low. It should be noted that the arrangement position determination block 23 may acquire an initial speed at the start of scrolling and determine an arrangement position and a size in the X-direction of the sub window SW in accordance with the acquired initial speed rather than always monitoring a scroll speed. In this case, while scroll is being executed, the sub-window display control block 24 displays the sub window SW that is fixed to a position and a size determined in accordance with the initial speed at the time of start of scrolling.

It should be noted that, in the above-mentioned description, the arrangement position determination block 23 determines an arrangement position and a size in the X-direction of the sub window SW in accordance with the visibility rank and the arrangement position in the X-direction of each display element E. On the other hand, the arrangement position in the Y-direction of the sub window SW may be determined regardless of the arrangement position and visibility rank of each display element E. For example, the arrangement position determination block 23 may determine a predetermined position as an arrangement position in the Y-direction of the sub window SW. Also, a size in the Y-direction of the sub window may be determined as desired such that information to be included in the sub window SW is included. In the example shown in FIG. 4, the arrangement position in the Y-direction of the sub window SW is set to top of the main window MW.

Also, the arrangement position determination block 23 may determine an arrangement position in the Y-direction of the sub window SW that is displayed while the web page P is being scrolled in the Y-direction, in accordance with the direction of this scrolling. To be more specific, the arrangement position determination block 23 determines an arrangement position in the Y-direction of the sub window SW such that, in the main window MW, the sub window SW is displayed in an area opposite to the direction in which the display target range T set to the web page P moves by scrolling. Namely, when scrolling is executed in which the display target range T moves down and, as a result, the display element E being displayed in main window MW moves up, the sub window SW is arranged in the upper half area of the main window MW (desirably, at the top of the main window MW). Conversely, when scrolling is executed in which the display target range T moves up and, as a result, the display element E being displayed in the main window MW moves down, the sub window SW is arranged in the lower half area of the main window MW (desirably, at the bottom of the main window MW). Consequently, the sub window SW can be displayed such that the contents of the web page P that is newly displayed into the main window MW by scrolling the web page P are not hidden.

Further, in the above-mentioned description, an arrangement position in the X-direction of the sub window SW is determined in accordance with an arrangement position and a visibility rank of each display element E in the web page P, but the arrangement position determination block 23 may also use other conditions for determining an arrangement position of the sub window SW. For example, in the above-mentioned description, the arrangement position determination block 23 determines the range r of the X coordinates in which the sub window SW is to be arranged on the basis of an arrangement position and a visibility rank in the X-direction of each display element E. If this range r exceeds the length of the sub window SW in the X-direction, the arrangement position determination block 23 may determine which position the sub window SW is to be arranged in the range r in accordance with various conditions such as user settings, contents of the sub window SW, and parameter information included in the HTML data. Also, an arrangement position of the sub window SW in the X-direction in the range r may be changed with a given timing while the web page P is being displayed.

Figure 5:
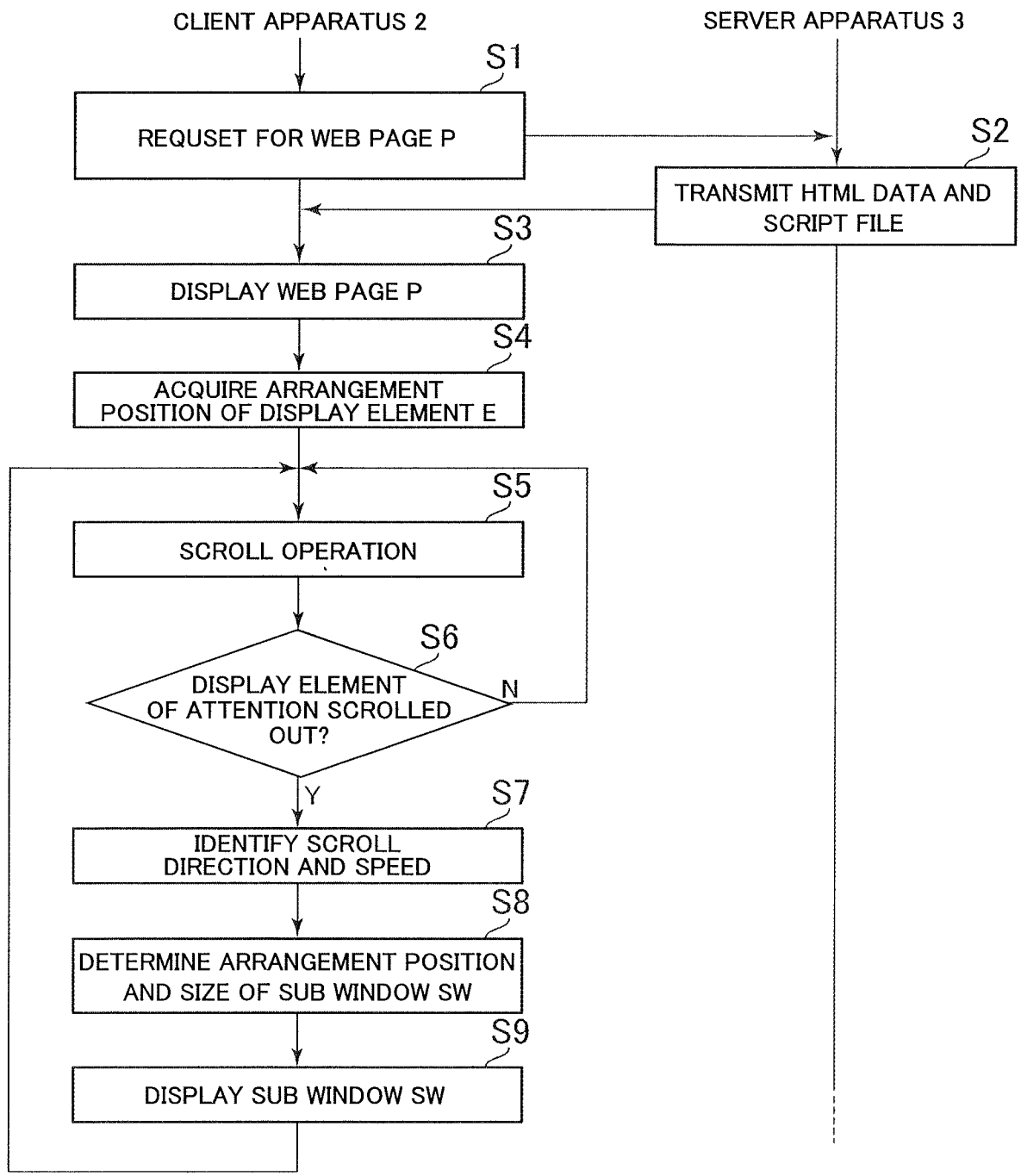
FIG. 5 is a diagram illustrating one example of a flow of processing that is executed by the service providing system.

The following describes in detail a specific example of the flow of processing that is executed by the client apparatus 2 and the server apparatus 3 in the present embodiment with reference to the flowchart shown in FIG. 5. It is assumed here that, if an important display element E (hereafter referred to as a display element of attention) included in the web page P is scrolls out of the main window MW, then the sub window SW that includes information equivalent to the display element of attention is displayed.

First, the web page display control block 21 of the client apparatus 2 transmits a request (an HTTP request) for the web page P to the server apparatus 3 in accordance with a user instruction or the like (S1). In response to this request, the server apparatus 3 transmits, to the client apparatus 2, HTML data for specifying the contents of the web page P and a script file describing a control program for realizing display control of the sub window SW (S2). It should be noted that if the contents of the web page P are dynamic, then the server apparatus 3 may newly create HTML data for specifying the contents of the web page P in accordance with parameters and the like included in the request of S1 and transmit the created HTML data to the client apparatus 2.

The web page display control block 21 of the client apparatus 2 creates the web page P on the basis of the HTML data received from the server apparatus 3 in S2 and displays the created web page P in the main window MW (S3). At this moment, information related to an arrangement position and a visibility rank of each display element E making up the web page P is acquired by the element position acquisition block 22 (S4).

Subsequently, while the web page P is being displayed, the arrangement position determination block 23 monitors whether or not scrolling of the web page P is executed. If the web page display control block 21 scrolls the web page P in accordance with an operation input into the operation input apparatus 15 by the user (S5), then the arrangement position determination block 23 determines whether or not a predetermined display element of attention has been scrolled out of the main window MW by this scrolling (S6). If the display element of attention is found not scrolled out, the processing is returned to the step before S5 to continue scroll monitoring. On the other hand, if the display element of attention is found scrolled out, then the arrangement position determination block 23 identifies the direction and the speed of scrolling of S5 (S7). Next, by use of the information related to the arrangement position and visibility rank of each display element E acquired by the element position acquisition block 22 in S4 and the information on the direction and the speed of scrolling identified in S7, the arrangement position determination block 23 determines an arrangement position and a size in the X-direction of the sub window SW (S8). On the basis of the arrangement position and the size determined in S8, the sub-window display control block 24 generates the sub window SW that includes contents of the display element of attention and displays the generated sub window SW in the screen S as overlapped with the main window MW (S9). Subsequently, the processing is returned to the step before S5 to continue scroll monitoring.

According to the embodiment of the present invention described above, an arrangement position in the X-direction of the sub window SW is determined in accordance with an arrangement position in the X-direction of the display element E making up the web page P, so that an arrangement position of the sub window SW can be determined so as not to hidden a specific display element E in the web page P displayed in the main window MW if the web page P is scrolled in the Y-direction. Therefore, the sub window SW does not tend to cause the inferior browsability of the web page P in the main window MW.

It should be noted that the embodiment of the present invention is not limited to that described above. For example, in the above-mentioned description, the visibility rank is set in three steps; however it is also practicable to set the visibility rank in more steps. Also, in addition to visibility, other indexes (an index related to importance of information, for example) may be set to each display element E to determine an arrangement position of the sub window SW on the basis of the contents of other indexes.

Further, in the above-mentioned description, the length in the Y-direction (the vertical direction of the main window MW) of the web page P exceeds the length of the main window MW and the web page P is scrolled in this direction; however it is also practicable that the length in the X-direction of the web page P exceeds the length of the main window MW and the web page P may be scrolled in the X-direction. In this case, the arrangement position determination block 23 may determine an arrangement position in the Y-direction of the sub window SW in accordance with an arrangement position of the Y-direction of each display element E included in the web page P.

Still further, in the above-mentioned description, the control program for realizing the element position acquisition block 22 and arrangement position determination block 23 is distributed to the client apparatus 2 from the server apparatus 3 along with the HTML data for specifying the web page P. However, it is also practicable for the client apparatus 2 to acquire the control program in another method. To be more specific, this control program may be provided to the client apparatus 2 in a form of an auxiliary program (an add-on program or the like) that operates in coordination with a web browser program. In this case, the client apparatus 2 downloads an auxiliary program beforehand from the server apparatus 3 that provides the HTML data or another server and installs the downloaded auxiliary program. Subsequently, when downloading the HTML data from the server apparatus 3 and displaying the web page P on the main window MW, the client apparatus 2 executes the auxiliary program installed beforehand, thereby realizing the functions of the element position acquisition block 22 and the arrangement position determination block 23.

Also, the element position acquisition block 22 and the arrangement position determination block 23 in the above-mentioned description may be realized by the server apparatus 3 rather than the client apparatus 2. In this case, the server apparatus 3 functions as the information processing apparatus practiced as one embodiment of the present invention. In this example, the client apparatus 2 creates the web page P and then transmits information related to an arrangement position of each display element E in the web page P concerned to the server apparatus 3. At the same time, the client apparatus 2 transmits information indicative of the size of the main window MW to the server apparatus 3. Further, if the web page P is scrolled, the client apparatus 2 may transmit the information about the scroll direction and the speed to the server apparatus 3. On the basis of these pieces of information received from the client apparatus 2, the server apparatus 3 executes the same processing as the case of the client apparatus 2 described above to determine an arrangement position of the sub window SW in the main window MW, thereby transmitting the information indicative of the positional coordinates of the determined arrangement position to the client apparatus 2. The client apparatus 2 displays the sub window SW at the position indicated by the information received from the server apparatus 3.

DESCRIPTION OF REFERENCE NUMERALS

1 . . . Service providing system, 2 . . . Client apparatus, 3 . . . Server apparatus, 11 . . . Control block, 12 . . . Storage block, 13 . . . Communication block, 14 . . . Display apparatus, 15 . . . Operation input apparatus, 21 . . . Web page display control block, 22 . . . Element position acquisition block, 23 . . . Arrangement position determination block, 24 . . . Sub-window display control block

The invention claimed is:
1. An information processing apparatus for determining an arrangement position of a sub display area in a screen of a display apparatus displaying a main display area and the sub display area such that the main display area and the sub display area are overlapped with each other, the information processing apparatus comprising:
  at least one memory operable to store program code; and
  at least one processor operable to read the program code and operate as instructed by the program code, the program code including:
    element position acquisition code configured to cause at least one of said at least one processor to acquire arrangement positions of at least two display elements arranged in a web page, the arrangement positions being positions in a crossing direction crossing a predetermined scroll direction of the web page displayed to be scrollable in the main display area;
    arrangement position determination code configured to cause at least one of said at least one processor to determine, in accordance with the acquired arrangement positions of the at least two display elements, an arrangement position of the sub display area in the crossing direction, wherein when a display element of attention is scrolled out from the main display area by a scrolling of the web page, the sub display area that includes information corresponding to the display element of attention is displayed, the at least two display elements include a first display element currently displayed in the main display area before the scrolling starts and a second display element not currently displayed in the main display area before the scrolling starts; and setting code configured to cause at least one of said at least one processor to determine visibility of each display element based on at least one attribute of each display element other than an arrangement position in the web page, the visibility denoting a scale indicative of easiness for a user to grasp a content indicated by each display element while the web page is being scrolled, and assign a higher rank to a display element having a higher visibility and assign a lower rank to a display element having a lower visibility, wherein the arrangement position determination code further causes at least one of said at least one processor to determine the arrangement position in the crossing direction of the sub display area further in accordance with a rank of each display element of the at least two display elements, and arrange the sub display area at the determined arrangement position in the crossing direction to overlap, in the predetermined scroll direction, with the main display area in which a lower rank display element, among the at least two display elements, is currently displayed or to be displayed after the scrolling and not to overlap, in the predetermined scroll direction, with the main display area in which a higher rank display element, among the at least two display elements, is currently displayed or to be displayed after the scrolling, in response to the sub display area overlapping with the main display area, a content of the web page in the main display area overlapped with the sub display area is hidden from view.

2. The information processing apparatus according to claim 1, wherein the arrangement position determination code is further configured to cause at least one of said at least one processor to determine the arrangement position in the crossing direction of the sub display area so as to avoid the arrangement position in the crossing direction of a display element of which the rank is assigned in accordance with the visibility satisfies a predetermined condition.

3. The information processing apparatus according to claim 1, wherein the arrangement position determination code is further configured to cause at least one of said at least one processor to determine the arrangement position of the sub display area while the web page is being scrolled in the predetermined scroll direction further in accordance with a speed of the scrolling.

4. The information processing apparatus according to claim 3, wherein based on the speed of the scrolling being less than a threshold, a width of the sub display area in the crossing direction is determined such that the sub display area does not overlap, in the predetermined scroll direction, with the main display area in which the higher rank display element, among the at least two display elements, is currently displayed or to be displayed after the scrolling, and based on the speed of the scrolling being equal to or greater than the threshold, the width of the sub display area in the crossing direction extends to overlap, in the predetermined scroll direction, with at least a part of the main display area in which the higher rank display element, among the at least two display elements, is currently displayed or to be displayed after the scrolling.

5. The information processing apparatus according to claim 1, wherein the arrangement position determination code is further configured to cause at least one of said at least one processor to change the arrangement position of the sub display area in accordance with whether or not the web page is being scrolled in the predetermined scroll direction.

6. The information processing apparatus according to claim 1, wherein the arrangement position determination code is further configured to cause at least one of said at least one processor to determine the arrangement position of the sub display area in the predetermined scroll direction.

7. The information processing apparatus according to claim 1, wherein the at least one attribute comprises at least one of a number of characters included in each display element or a font size of the characters.

8. The information processing apparatus according to claim 1, wherein the setting code causes at least one of said at least one processor to assign the higher rank to a display element of which a number of characters included therein is smaller and assign the lower rank to a display element of which a number of characters included therein is greater.

9. The information processing apparatus according to claim 1, wherein the arrangement position of the sub display area is determined such that the lower rank display element is hidden by the sub display area after the web page in the main display area is scrolled, and the higher rank display element remains unhidden by the sub display area even after the web page is scrolled.

10. An information processing method for determining an arrangement position of a sub display area in a screen of a display apparatus displaying a main display area and the sub display area such that the main display area and the sub display area are overlapped with each other, the information processing method comprising:

acquiring arrangement positions of at least two display elements arranged in a web page, the arrangement positions being positions in a crossing direction crossing a predetermined scroll direction of the web page displayed to be scrollable in the main display area;

determining, in accordance with the acquired arrangement positions of the at least two display elements, an arrangement position of the sub display area in the crossing direction, wherein when a display element of attention is scrolled out from the main display area by a scrolling of the web page, the sub display area that includes information corresponding to the display element of attention is displayed, the at least two display elements include a first display element currently displayed in the main display area before the scrolling starts and a second display element not currently displayed in the main display area before the scrolling starts;

determining visibility of each display element based on at least one attribute of each display element other than an arrangement position in the web page, the visibility denoting a scale indicative of easiness for a user to grasp a content indicated by each display element while the web page is being scrolled; and assigning a higher rank to a display element having a higher visibility and assigning a lower rank to a display element having a lower visibility, wherein the determining the arrangement position in the crossing direction of the sub display area is performed further in accordance with a rank of each display element of the at least two display elements, the sub display area is arranged in the crossing direction to overlap, in the predetermined scroll direction, with the main display area in which a lower rank display element, among the at least two display elements, is currently displayed or to be displayed after the scrolling and not to overlap, in the predetermined scroll direction, with the main display area in which a higher rank display element, among the at least two display elements, is currently displayed or to be displayed after the scrolling, in response to the sub display area overlapping with the main display area, a content of the web page in the main display area overlapped with the sub display area is hidden from view.

11. An information processing apparatus for determining an arrangement position of a sub display area in a screen of a display apparatus displaying a main display area and the sub display area such that the main display area and the sub display area are overlapped with each other, the information processing apparatus comprising:

at least one memory operable to store program code; and at least one processor operable to read the program code and operate as instructed by the program code, the program code comprising:

element position acquisition code configured to cause at least one of said at least one processor to acquire arrangement positions of a plurality of display elements arranged in a web page, the arrangement positions being positions in a crossing direction crossing a predetermined scroll direction of the web page displayed to be scrollable in the main display area;

arrangement position determination code configured to cause at least one of said at least one processor to determine, in accordance with the acquired arrangement positions of the at least two display elements, an arrangement position of the sub display area in the crossing direction, wherein when a display element of attention is scrolled out from the main display area by a scrolling of the web page, the sub display area that includes information corresponding to the display element of attention is displayed, the at least two display elements include a first display element currently displayed in the main display area before the scrolling starts and a second display element not currently displayed in the main display area before the scrolling starts; and setting code configured to cause at least one of said at least one processor to determine visibility of each display element based on at least one attribute of each display element other than an arrangement position in the web page, the visibility denoting a scale indicative of easiness for a user to grasp a content indicated by each display element while the web page is being scrolled, and assign a higher rank to a display element having a higher visibility and assign a lower rank to a display element having a lower visibility, wherein the arrangement position determination code further causes at least one of said at least one processor to determine the arrangement position in the crossing direction of the sub display area further in accordance with a rank of each display element of the plurality of display elements, and arrange the sub display area at the determined arrangement position in the crossing direction to overlap, in the predetermined scroll direction, with the main display area in which a lower rank display element of the plurality of display elements is currently displayed or to be displayed after the scrolling and not to overlap, in the predetermined scroll direction, with the main display area in which a higher rank display element of the plurality of display elements is currently displayed or to be displayed after the scrolling, in response to the sub display area overlapping with the main display area, a content of the web page in the main display area overlapped with the sub display area is hidden from view.

12. The information processing apparatus according to claim 11, wherein the arrangement position determination code is further configured to cause at least one of said at least one processor to determine the arrangement position of the sub display area while the web page is being scrolled in the predetermined scroll direction further in accordance with a speed of the scrolling.

13. The information processing apparatus according to claim 11, wherein the arrangement position determination code is further configured to cause at least one of said at least one processor to change the arrangement position of the sub display area in accordance with whether or not the web page is being scrolled in the predetermined scroll direction.

14. The information processing apparatus according to claim 11, wherein the arrangement position determination code is further configured to cause at least one of said at least one processor to determine the arrangement position of the sub display area in the predetermined scroll direction in accordance with the predetermined scroll direction.

15. An information processing method for determining an arrangement position of a sub display area in a screen of a display apparatus displaying a main display area and the sub display area such that the main display area and the sub display area are overlapped with each other, the information processing method comprising:

acquiring arrangement positions of a plurality of display elements arranged in a web page, the arrangement positions being positions in a crossing direction crossing a predetermined scroll direction of the web page displayed to be scrollable in the main display area;

determining, in accordance with the acquired arrangement positions of the at least two display elements, an arrangement position of the sub display area in the crossing direction, wherein when a display element of attention is scrolled out from the main display area by a scrolling of the web page, the sub display area that includes information corresponding to the display element of attention is displayed; and determining visibility of each display element based on at least one attribute of each display element other than an arrangement position in the web page, the visibility denoting a scale indicative of easiness for a user to grasp a content indicated by each display element while the web page is being scrolled;

assigning a higher rank to a display element having a higher visibility and assigning a lower rank to a display element having a lower visibility, wherein the determining the arrangement position in the crossing direction of the sub display area is performed further in accordance with a rank of each display element of the plurality of display elements, and the sub display area is arranged in the crossing direction to be overlapped, in the predetermined scroll direction, with the main display area in which a lower rank display element among the plurality of display elements is currently displayed or to be displayed after the scrolling and not to be overlapped, in the predetermined scroll direction, with the main display area in which a higher rank display element among the plurality of display elements is currently displayed or to be displayed after the scrolling, and in response to the sub display area overlapping with the main display area, a content of the web page in the main display area overlapped with the sub display area is hidden from view.

* * * * *